United States Patent [19]

Schneider et al.

[11] Patent Number: 4,947,618
[45] Date of Patent: Aug. 14, 1990

[54] BAG SEALING DEVICE

[75] Inventors: Werner Schneider, Hohenahr; Walter Baur, Gruendau, both of Fed. Rep. of Germany

[73] Assignee: Rovema Verpackungsmaschinen GmbH, Fernwald, Fed. Rep. of Germany

[21] Appl. No.: 247,873

[22] Filed: Sep. 22, 1988

[30] Foreign Application Priority Data

Sep. 23, 1987 [DE] Fed. Rep. of Germany ....... 3732033

[51] Int. Cl.$^5$ .................... B65B 51/30; B65B 9/12; B65B 9/20
[52] U.S. Cl. .................... 53/373; 53/552; 53/554; 156/583.1
[58] Field of Search ............... 53/551, 451, 373, 552, 53/554; 156/436, 439, 526, 583.1, 494

[56] References Cited

U.S. PATENT DOCUMENTS

| | | |
|---|---|---|
| 2,915,866 | 12/1959 | Bartlo . |
| 3,055,154 | 9/1962 | Markley et al. . |
| 3,256,673 | 6/1966 | Tew et al. ............................ 53/551 |
| 3,522,689 | 8/1970 | Wylie et al. . |
| 3,685,250 | 8/1972 | Henry et al. ........................ 53/551 |
| 3,850,780 | 11/1974 | Crawford et al. . |
| 3,892,060 | 7/1975 | Stanley, Jr. . |
| 4,291,520 | 9/1981 | Prince et al. ...................... 53/373 X |
| 4,433,527 | 2/1984 | Ramsey et al. ................... 53/373 X |
| 4,663,917 | 5/1987 | Taylor et al. . |
| 4,751,808 | 6/1988 | Hadden ............................. 53/551 X |
| 4,757,668 | 7/1988 | Klinkel et al. .................... 53/373 X |

FOREIGN PATENT DOCUMENTS 1389746 4/1975 United Kingdom .

Primary Examiner—Horace M. Culver
Attorney, Agent, or Firm—Flynn, Thiel, Boutell & Tanis

[57] ABSTRACT

A device for the cross-welding and/or cross-cutting of sealable foil material having inserted therein at regular intervals a particularly bulky fill material. Swingably mounted sealing jaws are forcedly guided in closed cam guideways which are an inverted mirror image of one another and located on opposite sides of a plane of symmetry (E) such that they each clamp foil material therebetween at a location whereat no fill material is located and along the plane of symmetry. The sealing jaws then swing out and away from the foil material and travel to the next area which does not contain fill material. Forcedly guided compressing members are arranged to travel in front of the sealing jaws, which compressing members compress the foil material at least over the sealing area determined by the sealing-jaw width. The compressing members are cylindrical, for example in the form of circular rods, rollers, cage bars and the like, preferably spring loaded and are relatively movable with respect to the sealing jaws. Swingably supported levers on the sealing-jaw carriers are used for mounting. Rollers are associated on both sides with the compressing members, which rollers roll along transversely with respect to the plane of symmetry on or in a guide member having generally a T-shape with hyperbolic-like curved feed sections.

14 Claims, 5 Drawing Sheets

BAG SEALING DEVICE

FIELD OF THE INVENTION

The present invention relates to a device for the cross-welding and/or cross-cutting of sealable foil material.

BACKGROUND OF THE INVENTION

Devices of the mentioned type are described in German Patent No. 22 24 407 (which corresponds to British Patent No. 1389746) and U.S. Pat. No. 3 850 780. They have an advantageous mechanism which effects a movement of two sealing jaws in closed cam guideways so that they clamp the foil material between one another over and as long as possible rectilinear distance without necessitating a lowering of the running speed for the purpose of a secure sealing of the foil material, which material is more difficult to process.

However, problems result during packaging of particularly bulky fill material, which can often involve considerable variances in volume during feeding and filling in spite of an even amount or weight dosing. For example, potato chips by all means do not have a uniform size, alone because even with a good grading significant potato-size variations can occur. Chips manufactured from freshly harvested potatoes can therefore possibly be above average in size, thus may be bulky; after a longer storage period, the dimensions are generally less due to shrinkage caused by a loss of moisture. On the other hand, the package size is often fixedly predescribed, for example by rigid foil processing measurements, by specific imprint patterns and the like, so that in automatic packaging systems difficulties during the sequence of operation were unavoidable up to now.

In view of this need, the purpose of the invention is to provide a device of the above-mentioned type wherein the automatic packaging of particularly bulky fill material can occur without any breakdown due to the processing of different individual volumes and wherein uniform package sizes are reliably assured through economic means.

According to the invention, compressing members are each forcedly arranged in front of the sealing jaws. Thus, it is achieved in a surprisingly simple manner that the volume of bulky fill material is compared in each case prior to the start of the sealing operation. The fill material is, at least in the area of the subsequent sealing surface, broken and moved into the bag at this area. The compressing members have a relative speed with respect to the package. A certain compressing of the fill volume is effected in the package which is being created due to the compressing members being moved toward one another in front of the sealing jaws and moving the bulky product parts into the package being created. Thus, the compressing members function as shaping tools, for which reason they can also be identified as roll compressors, strip slides, press rollers or the like. The inventive device is particularly also suited for fill material in which a crushed portion is basically tolerable. Bulky projecting product parts can thereby be crushed or broken by the compressing members or the shaping elements and moved farther into the package, so that the content is slightly compressed and the subsequent cross-sealing can occur without any problems at the pregiven area.

The compressing members are provided at the ends of the levers pivotally supported on the sealing-jaw carriers. Thus, one can utilize the conventional design of intermittently operating bagging machines of the above-mentioned type, with the sealing-jaw carriers carrying cut through pulling combined swivelling and lifting movements. Also such devices can be easily equipped with the inventive compressing members which, so to speak, ride with their levers on the sealing-jaw carriers. The length of the compressing members is preferably substantially equal to the length of the sealing jaws. It is very advantageous from a technical manufacturing standpoint, if the compressing members are constructed cylindrically, for example as circular rods, rollers, cage bars or the like, so that manufacture and installation are done in a particularly simple manner.

An advantageous design of the invention consists in the compressing members being spring loaded with respect to the sealing jaws and being relatively movable under the spring force. Tension springs can for this purpose be provided, which tension springs are each arranged between arms of the sealing jaws and the other ends of the levers. The latter can be dimensioned such that they can be swung on both sides of the sealing jaws passed their front edge. Important is the compressing members leading the sealing jaws such that the relationship between compressing-member distance (the area during which the foil is clamped) to the active sealing-jaw width is in any case greater than 1, preferably greater than 3.

A structurally particularly advantageous design exists if rollers are associated on both sides with the compressing members, which rollers roll along on or in a path of a guide member, which path extends transversely with respect to the plane of symmetry.

BRIEF DESCRIPTION OF THE DRAWINGS

Further characteristics, details and advantages of the invention will be apparent from a reading of the following descriptive text with reference to an exemplary embodiment in the drawings, in which.

DETAILED DESCRIPTION

Figure 1:
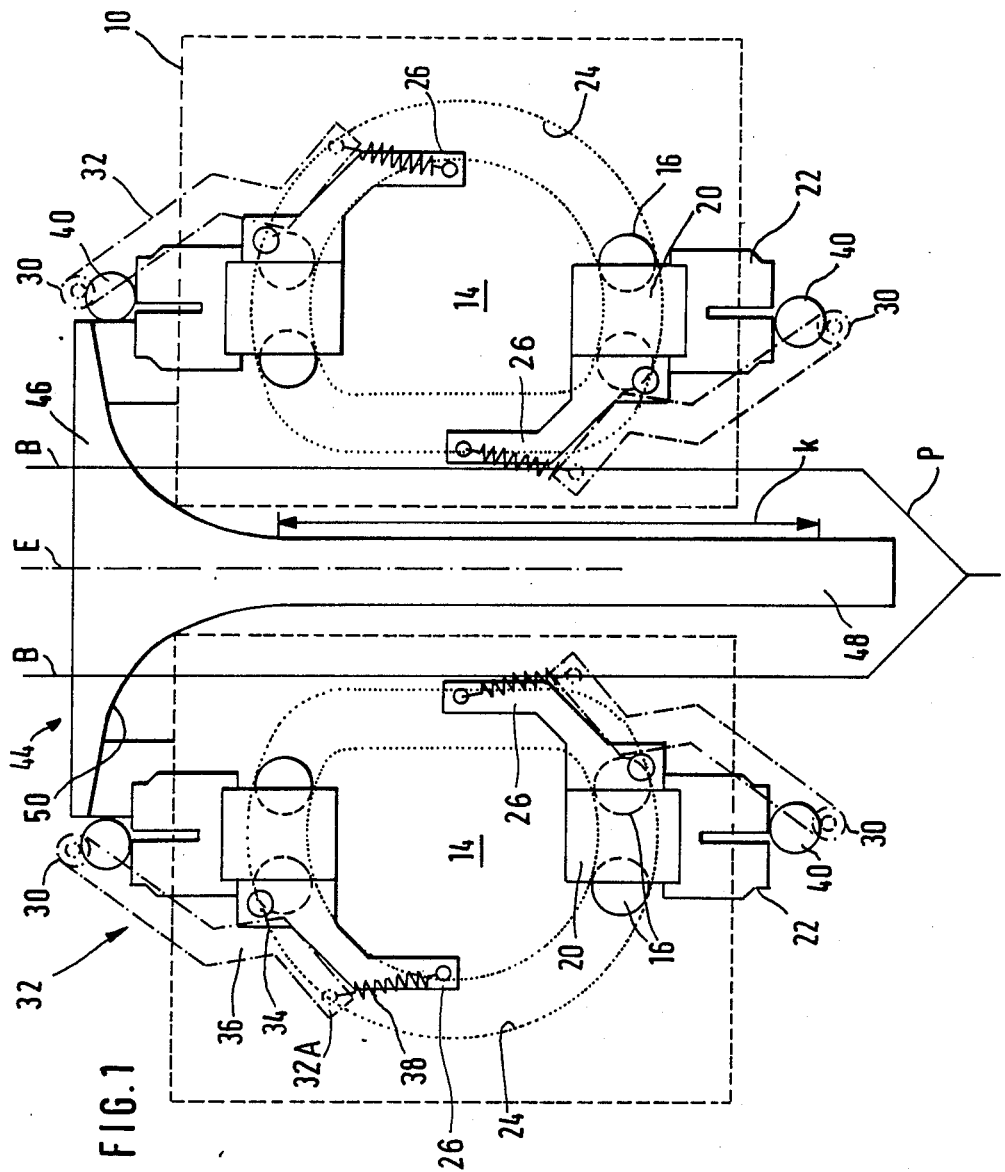
FIG. 1 is a schematic side view of an inventive device.
Figure 2:
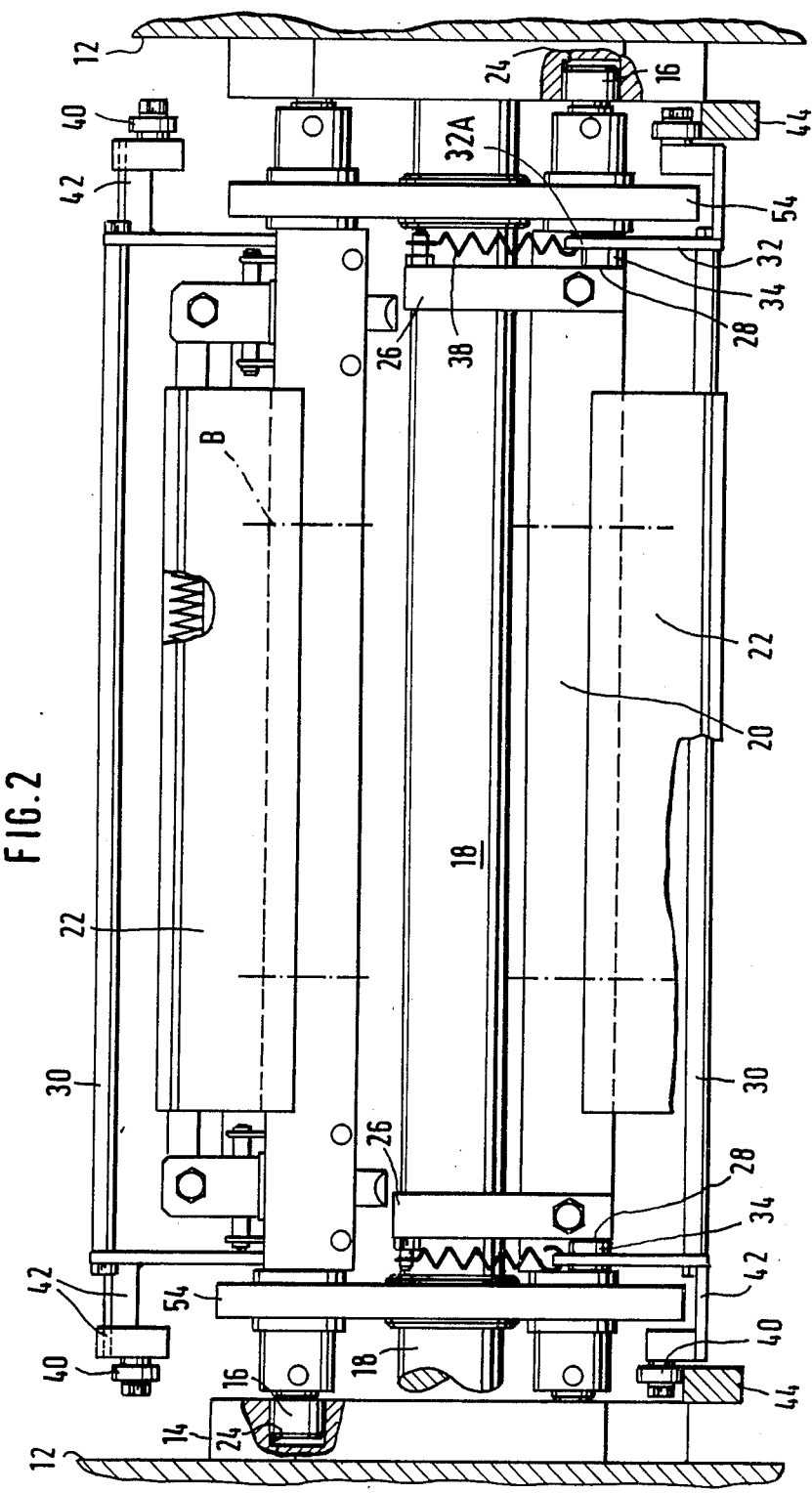
FIG. 2 is a top view of such a device, partially in cross section corresponding with the line II—II of FIGS. 5c and 6.
Figure 6:
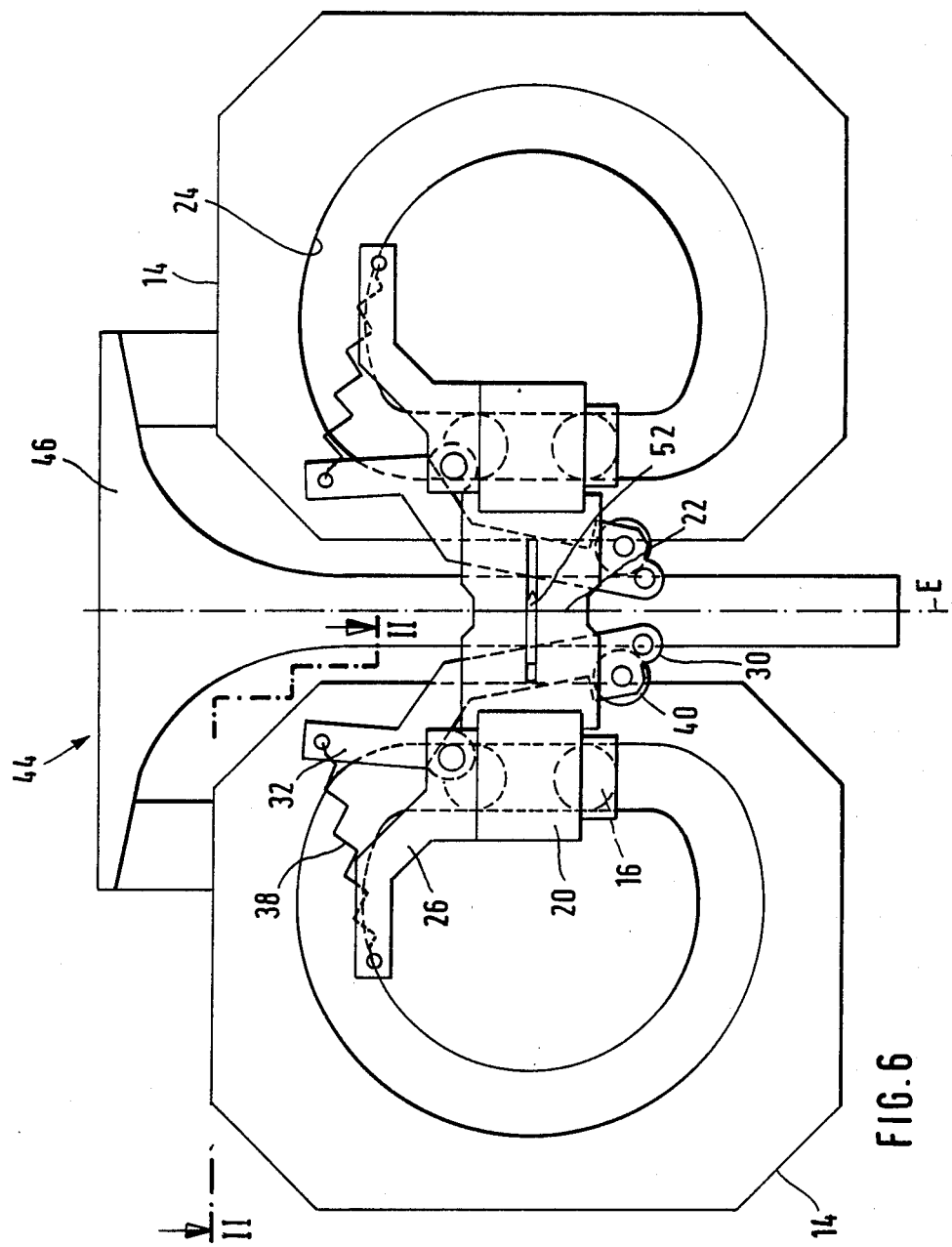
FIG. 6 is an enlarged side view corresponding with FIG. 5c.

The general design of an inventive device can be understood most clearly from FIGS. 1, 2 and 6. Opposing plates 12 are mounted on a frame 10 in order to facilitate a support of opposing cam blocks 14 thereon. Rollers 16 are guided in cam guideways 24 in the cam blocks. Also a drive shaft 18 is supported in the cam blocks, which drive shaft facilitates the rotary movement of a carrier 20 for the sealing jaws 22. The arrangement can in general correspond with the one according to German Patent No. 22 24 407 with the sealing jaws 22 being arranged on their carriers 20 on both sides of a plane of symmetry E and being, in a mirror image manner, forcedly guided in the closed guideways 14 or 24/16. Sealable, in particular tube-shaped foil material B is supplied to the device by conventional means (not illustrated in detail). The foil material B receives fill material at regular intervals.

In order to assure the automatic packaging of the fill material in the case of irregular volumes, elongated, laterally extending compressing members or shaping tools 30 are according to the invention arranged to travel in front of the sealing jaws 22. The compressing members or shaping tools 30 are supported at their laterally oriented ends on the free ends of levers 32 which are pivotally mounted, as by bearings 34, piggyback style on the carrier 20 of the sealing jaws 22. The levers 32 each have a bent section 36 in their center area and carry mounting structure 42 for guide rollers 40 adjacent their free ends. The guide rollers 40 run along a compressing track a distance k (FIG. 1). The compressing track is formed on a T-shaped guide member 44 for the purpose of evening out the volume of the packages P which are being created. The other ends 32A of the levers 32 are for this purpose connected by tension springs 38 to arms 26 provided on the sealing-jaw carriers 20. The springs 38 thus load the levers 32 toward the path provided on the guide member 44, which path generally extends hyperbolic-like and transfers starting out at a capping beam 46 of the T-shaped guide member 44 and extends through a curved feed section 50 into a stem section 48 which extends parallel to the plane of symmetry E.

Figure 3:
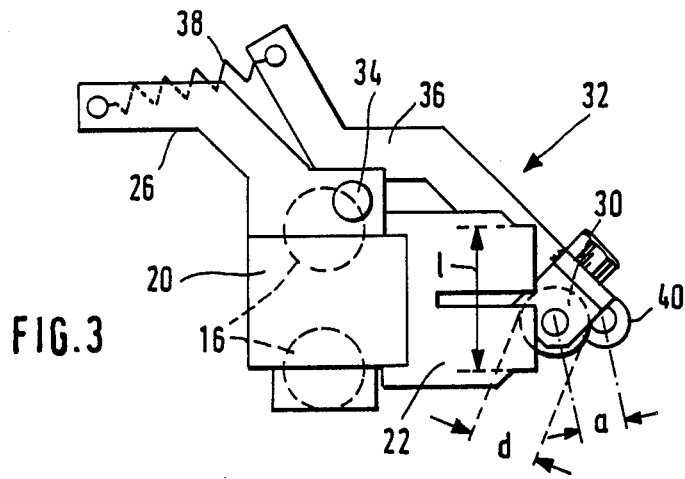
FIG. 3 is a side view of an assembly.

FIG. 2 shows in particular that the levers 32 with the compressing members or shaping tools 30 pass on both sides of the side edges 28 of the sealing jaws 22. The lower part of FIG. 2 illustrates (partially broken away) a sealing jaw 22 in the forward-moving position, that is, a position moving toward the foil material, corresponding with the upper half of FIG. 1. Whereas the other half of FIG. 2 illustrates the return movement of such an assembly, as it is shown at the bottom of FIG. 1 and separately in FIG. 3. From this one sees that the center distance a (FIG. 3) between the cylindrical compressing member 30 and the associated rollers 40 is less than the diameter d of the compressing member 30. Since heat must be generated at the sealing jaws 22, which is sufficient for a secure welding and the separating of the packages P, a certain sealing-jaw width L is pyrometrically predetermined. In connection with FIG. 1, the result obtained is that the relationship between the active portion k of the compression track and the sealing-jaw width L is inventively clearly greater than 1 and can easily reach or exceed 5:1.

OPERATION

The sequence of operation can be easily recognized in FIGS. 5a to 5d. While the guide rollers 16 of the sealing-jaw carriers on both sides of the plane of symmetry E are at the start (FIG. 5a) in the upper corner of the D-shaped cam guideway 24, the compressing members 30 are already at the start of the compression track and of the distance k, because the rollers 40 have already passed the curved feed section 50 of the guide member 44. The compressing members 30 move then faster than the foil material (not illustrated here) (FIG. 5b), while the sealing jaws 22 are only now swung toward the foil material. The sealing surfaces of the jaws 22 rest in the state of FIG. 5c opposite one another on the foil material, so that welding occurs. A separating element or knife 52 (FIG. 6) can at the same time separate the created package P (not illustrated here) from the foil material B (FIG. 1). The compressing members or shaping tools 30 are in this position already slightly removed from the plane of symmetry E, however, they can still engage the upper edge of the created package P. They also contribute to the package removal (FIG. 5d) when the sealing jaws 22 swing apart, as soon as the rollers 16 have arrived at the lower corner of the D-shaped cam guideways 24.

Figure 4:
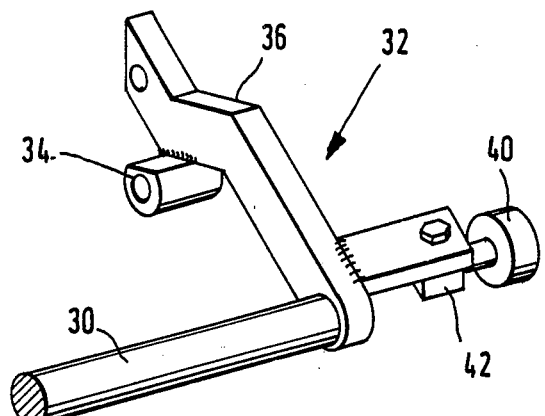
FIG. 4 is an oblique view of a swingable lever with a roller and a compressing member.
Figure 5:
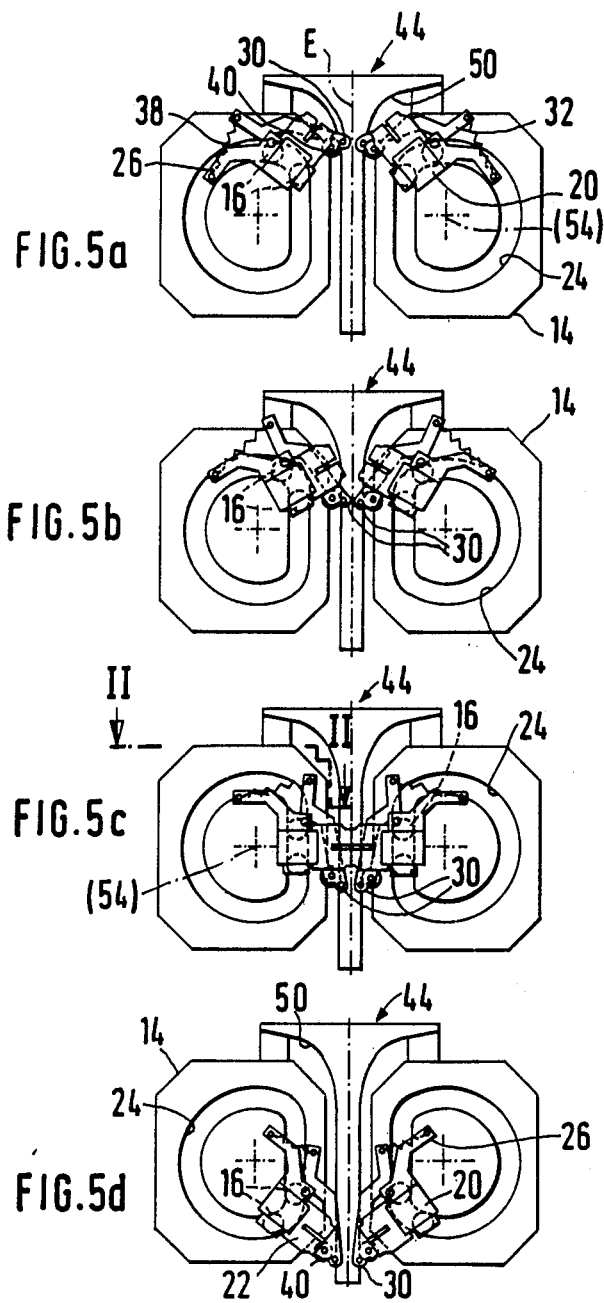
FIGS. 5a to 5d are schematized side views of the device corresponding with FIG. 1 during different phases of movement.

Even though FIGS. 5a to 5d and FIG. 6 each illustrate for a better understanding only one assembly (FIGS. 3 and 4) per cam guideway 14, FIG. 1 shows that the arrangement of two rotating assemblies finds easily space in the inventive device. Therefore, it is possible to reliably manufacture also short packages with a particularly high production rate.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a device for the cross-welding of sealable tubular foil material having inserted therein at spaced intervals deposits of bulky fill material, said device comprising at least two oppositely arranged, swingably mounted sealing jaws respectively engaged in closed cam guideways which are a mirror image of each other relative to a plane of symmetry, said cam guideways being located on opposite sides of the plane of symmetry, means for forcibly moving said sealing jaws along said cam guideways such that they clamp there between, over a path extending along the plane of symmetry, an area of the tubular foil material not having any fill material therein and then swing away from the foil material and travel to the next area thereof not having any fill material therein, the improvement wherein compressing members are positioned on said sealing jaws for travel therewith in front of said sealing jaws such that said compressing members compress the foil material at last over a portion of the foil material that is engaged by said sealing jaws, which portion has an area that is predetermined by a width of said sealing jaws, said sealing jaws each having a plurality of levers swingably supported thereon, said compressing members each being supported on respective ends of the associated said levers, said sealing jaws also having arms thereon and tension springs respectively connected between each said arm and a respective said lever at an end of said lever opposite said first-mentioned end thereof.

2. The device according to claim 1, wherein the length of said compressing members is substantially the same as the length of said sealing jaws.

3. The device according to claim 1, wherein said compressing members are constructed cylindrically.

4. The device according to claim 1, wherein said compressing members are spring loaded with respect to said sealing jaws by said tension springs and are movable relative to said sealing jaws under the spring force.

5. The device according to claim 1, wherein a pair of said levers are provided on each of said sealing jaws, said levers being located on opposite sides of each of said sealing jaws, and wherein each said lever is supported for pivotal movement at the associated said side of said sealing jaws.

6. In a device for the cross-welding of sealable tubular foil material having inserted therein at spaced intervals deposits of bulky fill material, said device comprising at least two oppositely arranged, swingably mounted sealing jaws respectively engaged in closed cam guideways which are a mirror image of each other relative to a plane of symmetry, said cam guideways being located on opposite sides of the plane of symmetry, means for forcibly moving said sealing jaws along said cam guideways such that they each clamp therebetween, over a path extending along the plane of symmetry, an area of the tubular foil material not having any fill material therein and then swing away from the foil material and travel tot he next area thereof not having any fill material therein, the improvement wherein compressing members are positioned on said sealing jaws for travel therewith in front of said sealing jaws such that said compressing members compress the foil material at least over a portion of the foil material that is engaged by said sealing jaws, which portion has an area that is predetermined by a width of said sealing jaws, and rollers are provided at opposite ends of each said compressing members, which roller are each engagable against a guide member to roll along a path defined by said guide member, which path extends transversely with respect to the plane of symmetry.

7. The device according to claim 6, wherein at least one of said rollers provided on each said compressing member has an axis of rotation adjacent to the associated one of said compressing members.

8. The device according to claim 7, wherein said compressing members are cylindrical and the distance between a central longitudinal axis of each said compressing member and said axis of rotation of said at least one roller is smaller than a diameter of said compressing member.

9. A device for the cross-welding of sealable foil material containing deposits of bulky filler spaced at regular distances, comprising at least two oppositely arranged, pivotally mounted sealing jaws respectively engaged in closed cam guideways which are mirror images of each other with respect to a plane of symmetry, means for forcibly moving said sealing jaws along said cam guideways such that they clamp therebetween, on a path extending along the plane of symmetry, a filler-free area of the foil material and then swing away from and back toward the foil material to reach the next filler-free area thereof, the improvement comprising squeezing members arranged on said sealing jaws for travel therewith in such a manner that the squeezing members load said sealing jaws and contact at least a sealing area of the foil material, which are is determined by a width of said sealing jaws, rollers provided on both ends of each said squeezing member, which rollers are each engagable against a guide member to roll along a path defined by said guide member, said guide member being generally T-shaped and including a head beam having curved portions on both sides of the plane of symmetry, and a trunk which is joined to said head beam at said curved portions.

10. The device according to claim 9, wherein said curved portions extend approximately hyperbolically, and wherein said head beam and trunk form approximately perpendicular end sections of said generally T-shaped guide member.

11. The device according to claim 10, wherein each said sealing jaw has a plurality of levers supported thereon, said compressing members being supported on respective ends of the associated said levers, an end of each said lever opposite said first-mentioned end thereof being connected to the associated said sealing jaw by a tension spring, and wherein disengagement of said rollers from said guide member can be determined by the orientation of said tension springs relative to said levers.

12. The device according to claim 11, wherein each said lever has a bent section and is supported on the associated said sealing jaw by a swivel bearing adjacent said bent section.

13. The device according to claim 12, wherein each said bent section is arranged in a center area of the associated said lever such that said ends of said lever project at an obtuse angle with respect to one another.

14. The device according to claim 9, wherein the ratio of the length of said trunk to the width of said sealing jaws is greater than 3 to 1.

* * * * *

UNITED STATES PATENT AND TRADEMARK OFFICE
CERTIFICATE OF CORRECTION

PATENT NO. : 4,947,618
DATED : August 14, 1990
INVENTOR(S) : Werner SCHNEIDER et al.

It is certified that error appears in the above-identified patent and that said Letters Patent is hereby corrected as shown below:

Column 4, line 44; change "last" to ---least---.
Column 5, line 14; change "tot he" to ---to the---.
Column 5, line 23; change "members" to ---member---.
Column 5, line 23; change "roller" to ---rollers---.
Column 6, line  7; change "load" to ---lead---.
Column 6, line  8; change "are" to ---area---.
Column 6, line 19; after "beam and" insert ---said---.

Signed and Sealed this

Twenty-first Day of December, 1993

Attest:

BRUCE LEHMAN

*Attesting Officer*    *Commissioner of Patents and Trademarks*